Feb. 23, 1932.   F. T. BOWDITCH   1,846,246
AUTOMATIC BATTERY CHARGING SYSTEM
Filed Sept. 25, 1928    2 Sheets-Sheet 1
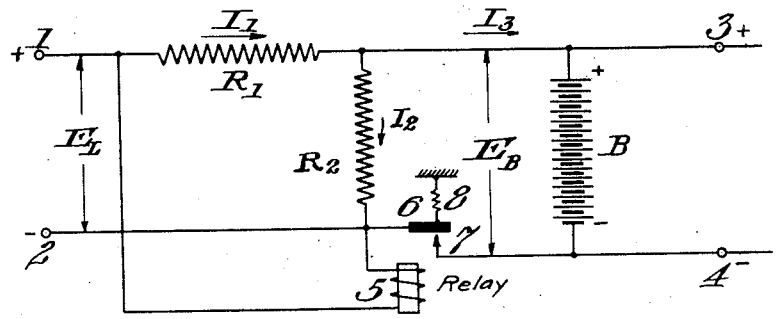
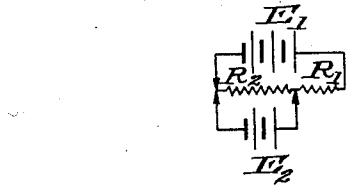
Inventor:
Frederick T. Bowditch,
By Byrnes Townsend & Brickenstein
Attorneys Patented Feb. 23, 1932

1,846,246

UNITED STATES PATENT OFFICE

FREDERICK T. BOWDITCH, OF LAKEWOOD, OHIO, ASSIGNOR TO NATIONAL CARBON COMPANY, INC., A CORPORATION OF NEW YORK

AUTOMATIC BATTERY CHARGING SYSTEM

Application filed September 25, 1928. Serial No. 308,303.

This invention relates to a battery charging circuit and to a device embodying the same. It relates to such circuit and device of a type which may be successfully employed in connection with rechargeable batteries of any kind, but which is particularly suitable for the trickle charging of dry cells or other batteries which require, for their best operation, a delicately controlled automatic charging system so regulated as simultaneously to prevent injury to the batteries by overcharging and falling off of the battery voltage due to undercharging.

An object of the invention is to provide such a battery charging system adapted to accomplish such delicately controlled automatic charging of batteries connected thereto, and providing means whereby the charge rate can be made to fall to zero at any desired battery voltage, and to assume any desired value at a lower battery voltage. A further object is to provide such a system which may be safely operated, if desired, from a voltage source higher in potential than that to which the voltage of the battery may be safely raised, such as, for example, a standard 110 volt commercial line. A still further object is to provide such a battery charging system which is adapted to keep the voltage of batteries to which it is applied at a substantially constant value, the charging rate increasing rapidly as the battery voltage drops below the desired value and an automatic cut-off of the charging current being provided when the battery voltage rises to the desired value. Other objects of the invention will appear from the following description.

It has heretofore been proposed, for example, to trickle charge batteries from a high potential source by the use of a simple series resistance. Such arrangements are both unsatisfactory and dangerous, in that if the ampere hour discharge demands on the battery are greater than the ampere hour charge provided therefor, the battery voltage falls off and the performance is not satisfactory, while if the battery charge rate is too high, the battery voltage quickly rises to values which may be injurious both to the battery itself and to the load circuit with which it is associated. The present invention affords an automatically regulated charging system which is free from such difficulties.

Figure 3:
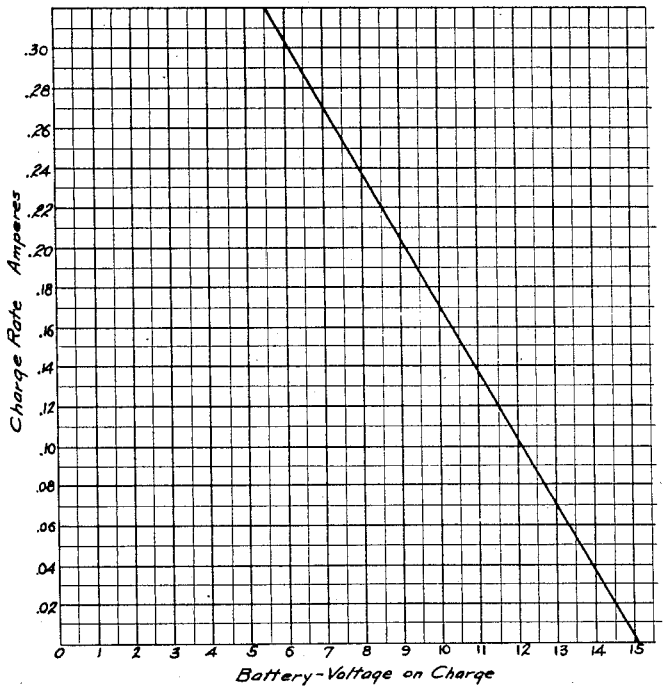
Figure 4:
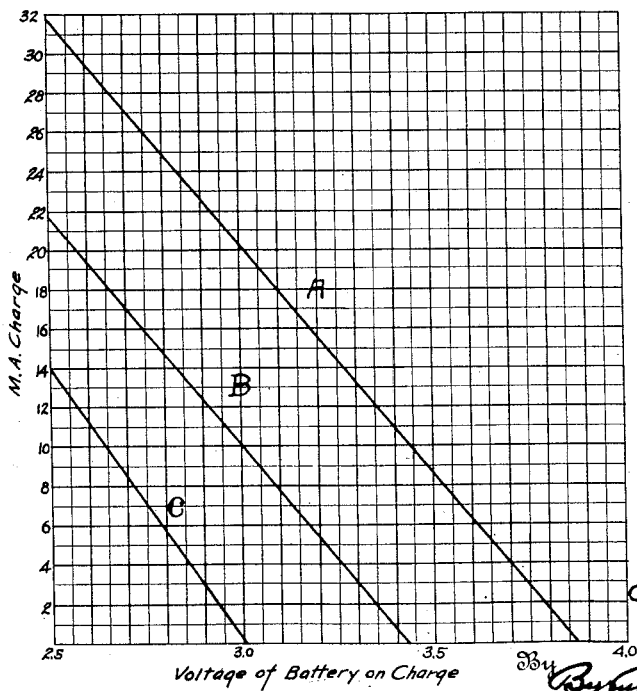

This charging system will now be described in connection with the accompanying drawings, in which Fig. 1 is a circuit diagram by way of example of one embodiment thereof, Fig. 2 is an example of an alternative embodiment thereof; and Figs. 3 and 4 are characteristic taper charging and cut off curves of the type obtained with charging systems such as are shown in Figs. 1 and 2.

Referring now to Fig. 1, 1 and 2 represent the positive and negative terminals, respectively, of a direct current voltage source, for example, any ordinary 110 volt line. 3 and 4 represent terminals which are adapted to be connected to any desired load, for example, the filament system of a radio receiving set, the plate circuit of such a set, an annunciator system, or other light or intermittent service electrical installation suitable for operation from a battery source of current. In series between the positive terminals 1 and 3 is connected a series resistance $R_1$. The battery, B, to be charged, is connected in series with resistance $R_1$, across the charging source 1, 2, as shown. In shunt to the battery B is connected a resistance $R_2$. If desired, a relay, for example comprising electromagnet 5, armature 6, contact 7, and spring 8, may be connected so as to break the connection of the battery to the charge circuit in the event of a failure of the charging source. Such a relay may constitute a desirable safety device, but is not necessarily an essential element of the invention.

In order to obtain the desired automatic taper charge and cut-off with the foregoing circuit arrangement, it is necessary that a certain definite relation shall exist between the values of the several circuit elements, including the line voltage, the battery voltage, and the two resistances $R_1$ and $R_2$. Thus if the values of the various circuit elements, currents and voltages are designated as follows:

$E_L$ = Line voltage in volts
$R_1$ = Resistance of $R_1$ in ohms
$R_2$ = Resistance of $R_2$ in ohms
$E_B$ = Battery voltage in volts
$I_1$ = Total line current in amperes
$I_2$ = Current through $R_2$ in amperes
$I_3$ = Battery charging current in amperes, as indicated on Fig. 1, the proper absolute and relative values for the resistances $R_1$ and $R_2$ in order to produce any desired automatic cut off voltage value and charge rate below the cut-off voltage, for a given case, may be calculated according to the following example:

Assume that the line voltage $E_L$ = 110 volts, the desired battery cut-off voltage is 15 volts, and that the demands of the battery load will be met by a trickle charge rate giving 0.1 ampere at a battery voltage of 12 volts. Now the total line current $I_1$ flowing through $R_1$ equals $E_L - E_B$ divided by $R_1$, and the portion of this current shunted around the battery through $R_2$ is equal to $E_B$ divided by $R_2$. The battery charge current $I_3$ is of course equal to the difference between these two current values.

We now have two conditions to fulfill. First, at a battery voltage of 15 volts, all the line current must be shunted through $R_2$, and second, at a battery voltage of 12 volts, 0.1 ampere must flow through the battery. The general expression for battery charge current as just demonstrated is $$\text{Charge current} = I_3 = \frac{E_L - E_B}{R_1} - \frac{E_B}{R_2} \quad (1)$$

Substituting in this equation the values imposed by a charge current cut-off at $E_B = 15$ volts, we obtain $$I_3 = 0 = \frac{110 - 15}{R_1} - \frac{15}{R_2} \quad (2)$$

or, by clearing of fractions and transporting, $$95 R_2 = 15 R_1 \quad (3)$$

Similarly, substituting in Equation (1) the values imposed by a charge rate of 0.1 ampere at a battery voltage of 12 volts, we obtain $$I_3 = 0.1 = \frac{110 - 12}{R_1} - \frac{12}{R_2} \quad (4)$$

or $$0.1 = \frac{98}{R_1} - \frac{12}{R_2} \quad (5)$$

Equations (3) and (5) are two simultaneous equations with only two unknowns, $R_1$ and $R_2$, which are readily determined by substitution, giving $R_1 = 220$ ohms and $R_2 = 34.74$ ohms, or nominally 35 ohms. The cut-off charge curve for the battery in a circuit having these values of resistance is plotted by computation in Fig. 3. It will be seen that the conditions prescribed are met with, and that the charge curve is steep enough to insure the maintenance of a normal battery voltage, yet with a positive cut-off preventing a rise in voltage to dangerous values. The slight discrepancy shown by the cut-off at 15.1 volts instead of 15.0 volts is occasioned by the use of 35 ohms instead of 34.74 ohms.

It is of course obvious that any other set of conditions may be as accurately met by the use of suitable resistances calculated as above. In the above example, a continuous load of about 50 watts is drawn from the 110 volt line. For a lighter load service, demanding a trickle charge rate lower than that calculated for above, the resistances $R_1$ and $R_2$ would be proportionately higher and the wattage consumption lower.

The operation of the circuit illustrated in Fig. 1 may be briefly described as follows:

The total line current, $I_1$, flows through $R_1$ and divides, part flowing through $R_2$ and part flowing as charge current through the battery. As the battery voltage rises, more and more of the total line current is shunted through $R_2$ until a point is reached where the battery current falls to zero. Conversely, as the battery voltage falls under discharge, it draws a proportionately larger share of the total line current.

Figure 2 represents an alternative arrangement adapted for the cut-off charging of a small battery from a battery of higher voltage. For values of $R_1 = 50$ ohms and $R_2 = 300$ ohms, the cut-off values and charging rates for voltages of battery $E_1$ equal to 4.5 volts, 4.0 volts and 3.5 volts, respectively, are shown in curves A, B and C of Fig. 4. $R_1$ and $R_2$ may be suitably arranged in the form of a resistance potentiometer $R_1$—$R_2$, as shown, so that the charging rate and cut-off value may be controlled as desired. As a specific example, $E_1$ may comprise three six-inch cells and $E_2$ may be a small two cell battery, such as an earphone battery, two flashlight cells, or the like, which is subjected to intermittent service and which it is desired to charge periodically from the six-inch cells. For example, an earphone battery which normally lasts from 7 to 10 days to a 2-volt cut-off, has been found, when charged nightly from 3 six-inch cells, to last substantially in excess of six weeks, while the six-inch cells employed for charging purposes, when used 15 hours per night, have been found to last approximately 5 months.

A suitable battery charging unit embodying the circuit shown in Fig. 2 may comprise, for example, a container designed to receive the desired number of six-inch dry cells, the resistance potentiometer $R_1$—$R_2$, and a space to receive the small battery to be charged. Spring clips may be provided in connection with the potentiometer to receive the battery to be charged, and are preferably arranged to close the charging circuit only when the battery to be charged is in place, thus preventing drain on the charging battery except when the smaller battery is actually being charged.

The invention may be applied to an alternating current voltage source as well as to a direct current voltage source. In the case of an alternating current voltage source a suitable rectifying device, as well as a filter device if desired, is associated therewith. In such a case, the series resistance of the rectifying device, and filter if employed, may be included as a part of the resistance $R_1$. Other variations of the specific embodiments and circuit arrangements described herein, fall, of course, within the scope of the present invention.

I claim:

A battery charging system comprising, in combination, a battery to be charged, a source of direct current charging potential higher in voltage than the voltage to which said battery is to be charged, a resistance connected in series between said source of potential and said battery, and a resistance connected in shunt with said battery, said resistances being chosen and proportioned as regards both their absolute and their relative values, to produce a delicately controlled automatic cut-off of the battery charging current at a predetermined battery voltage and a predetermined tapered battery charging rate at battery voltages lower than said cut-off voltage, in accord with the formula:

$$I_3 = \frac{E_L - E_B}{R_1} - \frac{E_B}{R_2}$$

where $I_3$ represents the battery charging current in amperes, $E_L$ represents the potential of the line or direct current charging source in volts, $E_B$ represents the battery potential in volts, and $R_1$ and $R_2$ represent the values in ohms of the series and shunt resistances respectively.

In testimony whereof, I affix my signature.

FREDERICK T. BOWDITCH.